United States Patent [19]

Colson

[11] Patent Number: 4,603,072
[45] Date of Patent: Jul. 29, 1986

[54] HONEYCOMB INSULATING MATERIAL

[75] Inventor: Wendell B. Colson, Boulder, Colo.

[73] Assignee: Thermocell, Ltd., Broomfield, Colo.

[21] Appl. No.: 612,876

[22] Filed: May 22, 1984

Related U.S. Application Data

[63] Continuation-in-part of Ser. No. 406,319, Aug. 9, 1982, Pat. No. 4,450,027.

[51] Int. Cl.[4] .............................................. B32B 3/12
[52] U.S. Cl. ..................................... 428/116; 428/188
[58] Field of Search ........................ 428/73, 116, 188; 156/197, 291

[56] References Cited

U.S. PATENT DOCUMENTS

| | | | |
|---|---|---|---|
| Re. 30,254 | 4/1980 | Rasmussen | 160/84 R |
| Re. 31,129 | 1/1983 | Rasmussen | 156/193 |
| 2,020,639 | 11/1935 | Grayson et al. | 428/188 X |
| 3,164,507 | 1/1965 | Masuda | 156/197 |
| 3,165,820 | 1/1965 | Fromson | 156/197 X |
| 3,281,516 | 10/1966 | Southwick | 264/285 |
| 3,416,051 | 12/1968 | Pinto et al. | 318/6 |
| 3,428,515 | 2/1969 | Lorentzen | 156/197 X |
| 3,762,980 | 10/1973 | Maggio | 156/461 |
| 3,963,549 | 6/1976 | Rasmussen | 156/193 |
| 4,019,554 | 4/1977 | Rasmussen | 428/188 X |
| 4,242,161 | 12/1980 | Hulten et al. | 156/197 |
| 4,288,485 | 9/1981 | Suominen | 156/291 X |
| 4,346,132 | 8/1982 | Cheng et al. | 428/188 X |
| 4,450,027 | 5/1984 | Colson | 428/116 X |

FOREIGN PATENT DOCUMENTS

| | | | |
|---|---|---|---|
| 129793 | 11/1948 | Australia | 428/116 |
| 988064 | 4/1965 | United Kingdom | 156/197 |
| 1308296 | 2/1973 | United Kingdom | |

Primary Examiner—Henry F. Epstein
Attorney, Agent, or Firm—Pennie & Edmonds

[57] ABSTRACT

The method and apparatus for fabricating honeycomb expandable insulation panels disclosed herein includes a method and apparatus for folding a continuous thin film of flexible plastic material into a uniform, open faced tubular configuration and for heat setting the folds in permanent sharp creases. It also includes a rotatable rack apparatus for continuously stacking successive lengths of the tubular formed plastic film one on top of another on flat surfaces and adhering them together in the form of a neat, uniform expandable panel of interior honeycomb cell configuration.

6 Claims, 15 Drawing Figures

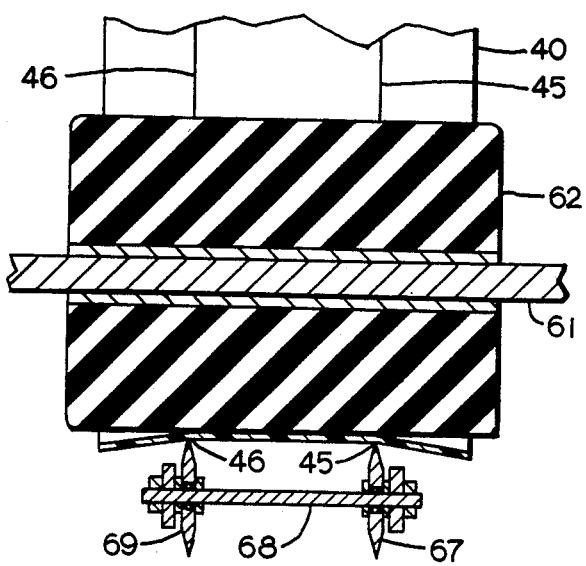
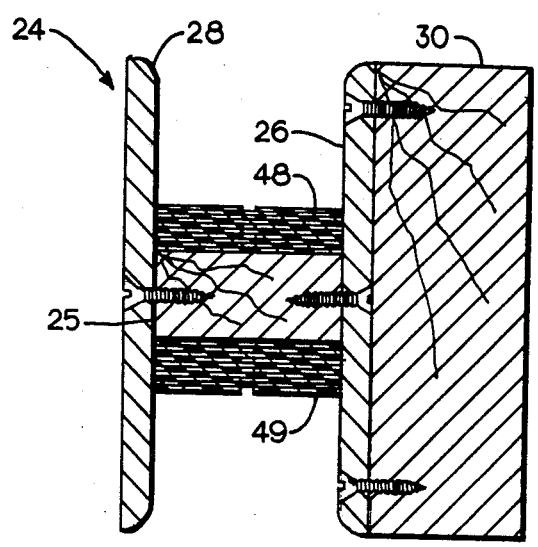
FIG. 3
FIG. 11
FIG. 4
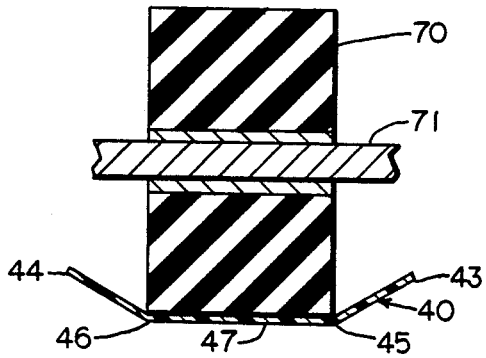
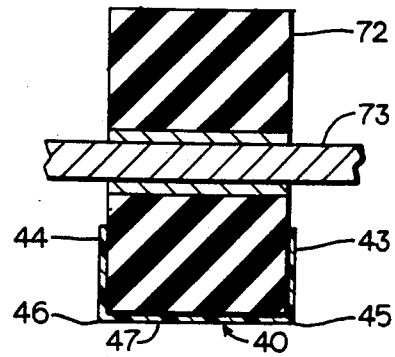
FIG. 5
FIG. 6
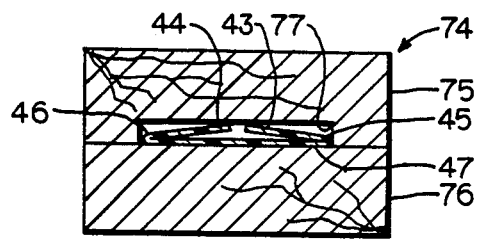
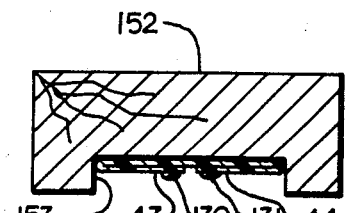
FIG. 7
FIG. 8

HONEYCOMB INSULATING MATERIAL

This patent application is a continuation-in-part patent application of Ser. No. 406,319, filed on Aug. 9, 1982, now U.S. Pat. No. 4,450,027, issued May 22, 1984.

BACKGROUND OF THE INVENTION

The present invention is related to movable insulation, and more specifically to expandable honeycomb insulation panels fabricated of a flexible thin film plastic material.

With the advent of the energy shortages experienced over the last decade, there has been a renewed interest in energy conservation applications related to heat gains and losses through poorly insulated wall areas, such as windows and the like. One of the basic tenets of passive solar energy saving designs for building is that large generally south-facing windows can be used to gain heat during sunny winter days. However, large windows are also responsible for heat loss during cold winter nights due to re-radiation of the heat from the interior of the house through the windows to the colder exterior. On the other hand, during hot summers, it is desirable to keep the heat from the sunlight during the day out of the interior of the house and to allow the heat in the house to radiate to the outside during the nights. Therefore, in order to take optimum advantage of the heating and cooling cycles of the sun or absence thereof during day and night periods, it is necessary to be able to move insulation in place over the windows or to retract it at appropriate times to allow the transfer of heat therethrough or to prohibit the transfer of heat therethrough as desired. This need for movable insulation panels has resulted in a renewed interest in the use of honeycomb structured panels for movable insulation purposes since they contain numerous individual dead air space cells and are readily expandable and contractable. However, it is also necessary to have a material that reflects sunlight and is able to maintain its effectiveness, shape, structural rigidity and appearance through wide-ranging temperature variations and over long periods of use. During hot summer days when the panel is in place over the window, temperatures can reach well over 100 degrees F. Alternately, on cold winter nights, the temperatures can be quite low.

In other kinds of movable insulation structures, it has been found that a thin film polyester plastic material, commonly known by the trademark Mylar, has suitable characteristics for movable insulation applications. It can withstand the temperature variations required, reflective coatings can be applied on the surfaces thereof, it has the required longevity, and it is relatively inexpensive. However, past efforts to fabricate honeycomb movable insulation panels from thin film polyester or Mylar material have left much to be desired. For example, it has been found to be quite difficult to fabricate on a mass production basis clean cut, uniform and neat appearing panels with no wrinkles or warps to detract from the appearance thereof or to interfere with the insulating function of the panels. Further, mechanical folds and creases in the plastic film tend to lose their sharpness and sag or become rounded over time. The failures are particularly troublesome when the material is subject to high temperatures during hot summer applications, since the molecular bias of the plastic film material is toward the flat configuration of which is was manufactured. Prior attempts to set the folds or creases on the edges by pressure and by heating have not been successful because these methods cause internal stresses that result in warps and wrinkles. Further, prior art attempts at stacking adjacent tubular layers of the thin film plastic material to form the panels have also been generally unsatisfactory in that they result in wrinkles and warps, and uneven lines. Some prior attempts have also included exceedingly cumbersome machinery having many strips of material running simultaneously.

SUMMARY OF THE INVENTION

Accordingly, it is an object of the present invention to provide a honeycomb panel that is long lasting, relatively inexpensive, and has a neat, clean cut appearance with no wrinkles or warps that detract from the appearance or interfere with the function thereof.

It is also an object of the present invention to provide an expandable and contractable honeycomb movable insulation panel fabricated with a thin film polyester material that is effective insulation and heat reflective when expanded into position over a window or other opening.

Another object of the present invention is to provide a honeycomb panel fabricated from a continuous elongated band of flexible thin film plastic material in a continuous running operation.

A further object of the present invention is to provide a honeycomb insulation panel fabricated with flexible thin film plastic material in a tubular form with sharp, permanent ceases.

A still further object of the present invention is to provide a honeycomb cell expandable insulation panel that is neat and clean cut in appearance, is dependable, and is capable of maintaining into shape over long periods of time and through extreme heat and cold environments.

The method by which the expandable honeycomb insulation panels of the present invention are formed includes a continuous process of manipulating a continuous length of thin plastic film to form uniform, clean-cut, neat, and effective insulation panels. It includes the steps of continuously creasing and folding the thin plastic film into an open-sided tubular structure, heat setting the folds against a surface and under constant tension in an effective, uniform manner that eliminates internal stresses that could otherwise cause warps or wrinkles, applying adhesive material to the surface of the open sided tubular structure, and continuously stacking the tubular film in layers on a flat surface or a plurality of flat surfaces to eliminate any curves that might cause wrinkles or warps in the finished product.

The apparatus for forming the panels of the present invention provides the means to fabricate an expandable honeycomb moveable insulation material according to the method described above. In particular, it includes an initial creaser assembly in which a pair of spaced-apart sharp wheels are pressed into the film to form uniform creases along which the film material will be folded. It also includes a folding assembly to fold the lateral edges at the crease over the mid-portion thereof and a press assembly to mechanically crimp the folds. The apparatus also includes a heat setting assembly for heating the plastic film material to a sufficiently high temperature to permanently set the folds therein. This heat setting structure provides a uniform surface around the peripheral of a large diameter heated roller on which the folded film is pressed under constant tension to eliminate internal stresses in the material.

A drive assembly pulls the plastic film through the folding and heat setting assemblies, and a positive displacement pump feeds a liquid adhesive through an applicator for deposition onto the surface of the folded tubular plastic film. The pump is driven from the film drive assembly so that the rate of deposition of the adhesive material on the film is always in direct relation to the rate of speed in which the film moves through the apparatus in order to maintain uniform beads of adhesive for clean cut glue lines in the finished panel product. The apparatus also includes a rotatable stacking bed with flat surfaces on which successive lengths of tubular film are stacked in uniform layers one on another where they are adhered together to form the panel structures. The apparatus also includes a tension and speed control assembly for maintaining a constant tension on the film as it is stacked uniformly in layers on the rotating stacking bed.

The invention includes a panel comprised of a plurality of elongated thin plastic film tubes stacked and adhered together with sharply creased edges tending to bias the tubes closed in order to maintain its sharp crisp appearance and effective insulating qualities.

BRIEF DESCRIPTION OF THE DRAWINGS

Other objects, advantages, and capabilities of the present invention will become more apparent as the description proceeds, taken in conjunction with the accompanying drawings, in which:

FIG. 3 is a cross-sectional view of the initial creasing apparatus taken along lines 3—3 of FIG. 1;

FIG. 4 is a cross-sectional view of the alignment block taken along lines 4—4 of FIG. 1;

FIG. 5 is a cross-sectional view of the first folding roller taken along lines 5—5 of FIG. 1;

FIG. 6 is a cross-sectional view of the second folding roller taken along lines 6—6 of FIG. 1;

FIG. 7 is a cross-sectional view of the folding track taken along lines 7—7 of FIG. 1;

FIG. 8 is a cross-sectional view of the final alignment block taken along lines 8—8 of FIG. 1;

FIG. 11 is a cross-sectional view of the stacking arm taken along lines 11—11 of FIG. 1;

DETAILED DESCRIPTION OF THE PREFERRED EMBODIMENT

Figure 1:
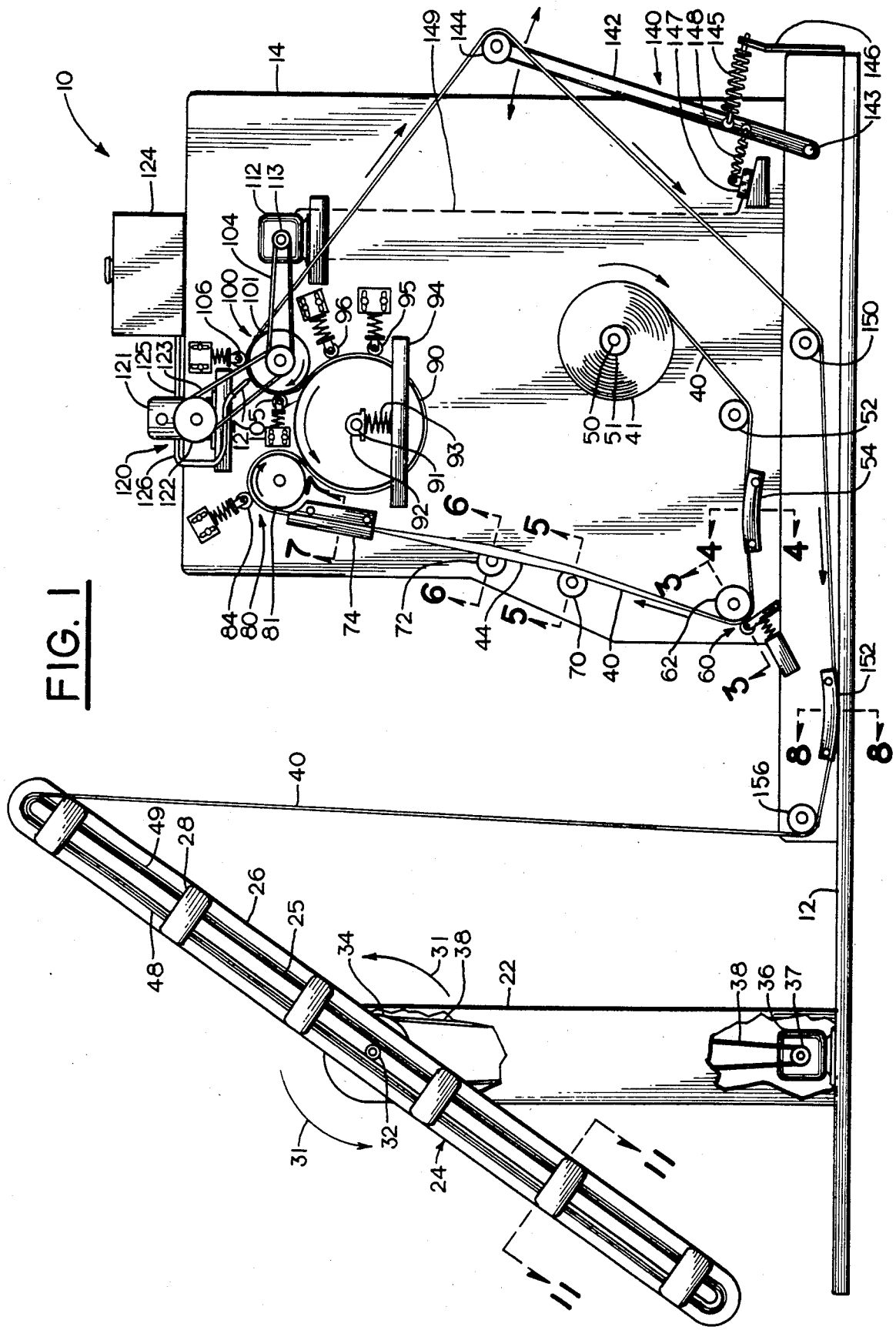
FIG. 1 is a plan view of the apparatus for fabricating honeycomb insulation material according to the present invention.
Figure 14:
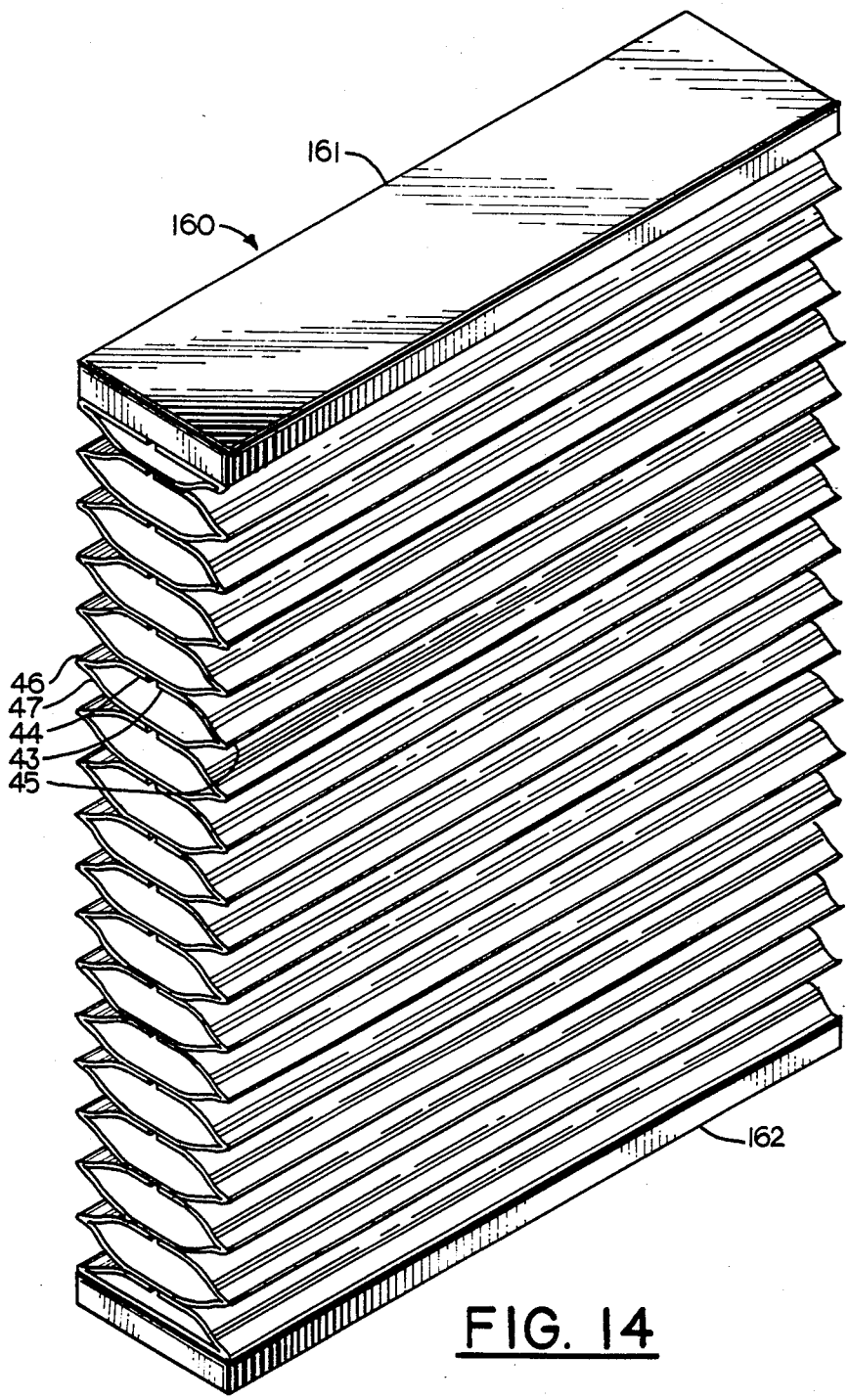
FIG. 14 is a perspective view of the honeycomb insulation material fabricated according to the present invention shown unfolded for use as an insulating material.
Figure 14:
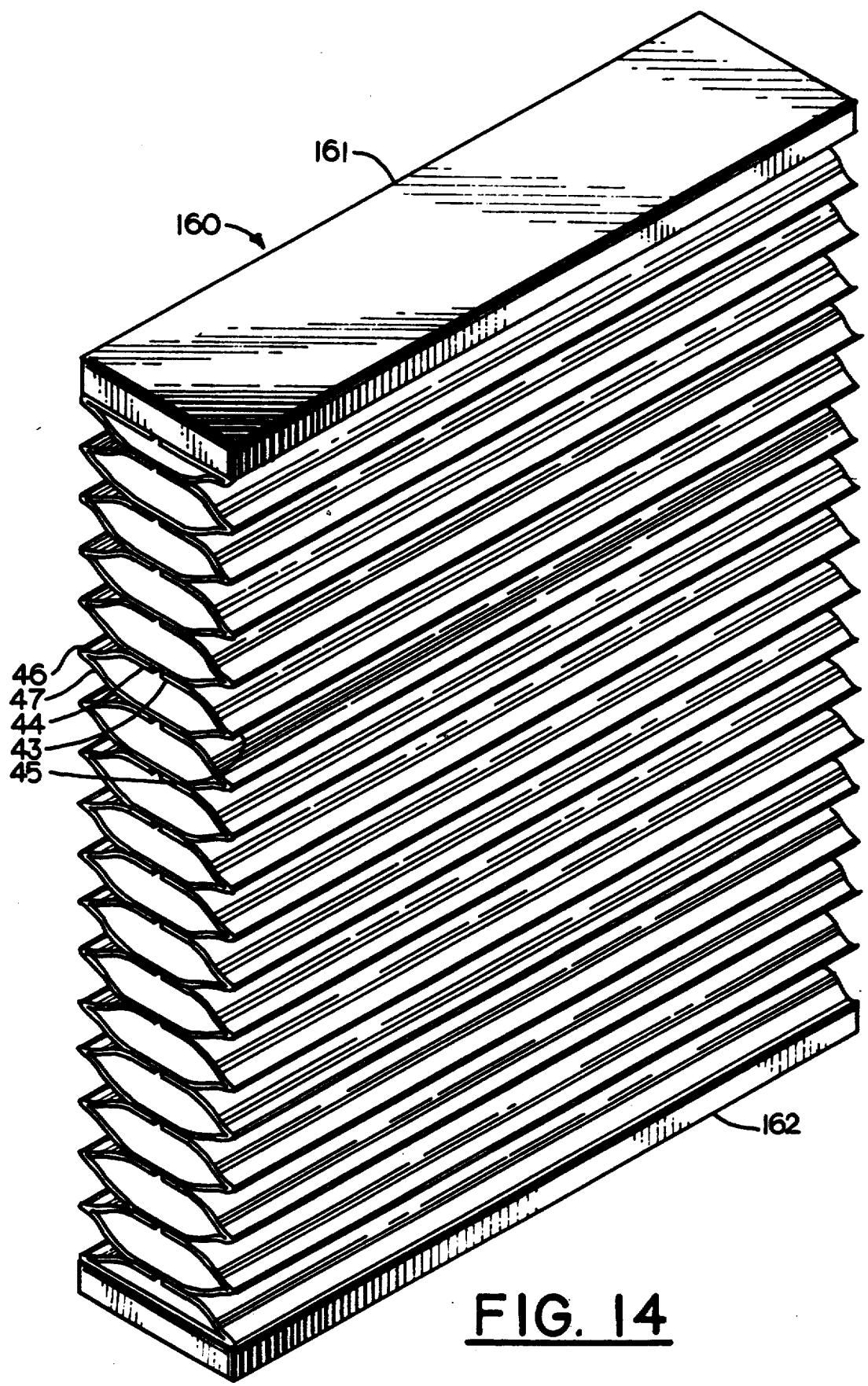

The apparatus for fabricating honeycomb insulation material is shown in FIG. 1. It is comprised of five major components designed for forming a continuous elongated strip of thin film polyester material into honeycomb movable insulation as shown in FIG. 14. The creaser assembly 60 forms an initial crease in the polyester film to facilitate folding by rollers 70, 72 and by folding channel 74. The crimper assembly 80 presses a permanent crimp in the material to form an open faced tube. The heat roller assembly 90 heats the polyester film to a pre-selected temperature for heat setting the crimp. The drive roller assembly 100 pulls the film through the preceding apparatus, and the glue applicator assembly 120 deposits metered beads of glue on the film for adhering adjacent lengths of the film to each other in laminated fashion on the stacking assembly 20. The tension and speed control assembly 140 maintains a constant tension on the film strip 40 as it is stacked on the stacking assembly 20, and it controls the speed at which the film is pulled through the preceding apparatus to conform to the film wrapping speed of the stacking assembly 10. The stacking assembly 20 is designed to continuously stack layer upon layer of the folded film 40 in equal lengths to form the panel of honeycomb insulating material shown in FIGS. 14 and 15.

The raw material utilized in this process is a continuous strip of thin film polyester plastic material, such as Mylar 40 or other similar material. A supply roll 41 of the film material 40 is mounted on a shaft 50. A slip clutch arrangement 51 allows the roll 41 to rotate for feeding out a continuous strip of film material, but only when a sufficient threshhold of tension is applied. Therefore, this slip clutch 51 sets and maintains initial tension of the film strip 40 as it is unrolled and fed through the apparatus 10.

After unrolling from the roll 41, the film strip 40 passes around a guide roller 52 and into an alignment block 54, which is effective to keep the film strip 40 in proper alignment with the initial creasing assembly 60. The alignment block 54, as shown in FIG. 4, includes a block body with a channel 55 recessed into the upper surface thereof. The channel 55 has a width approximately equal to the width of the film material 40 so that it is effective to guide the film strip 40 in proper alignment into the initial creasing assembly 60.

Figure 2:
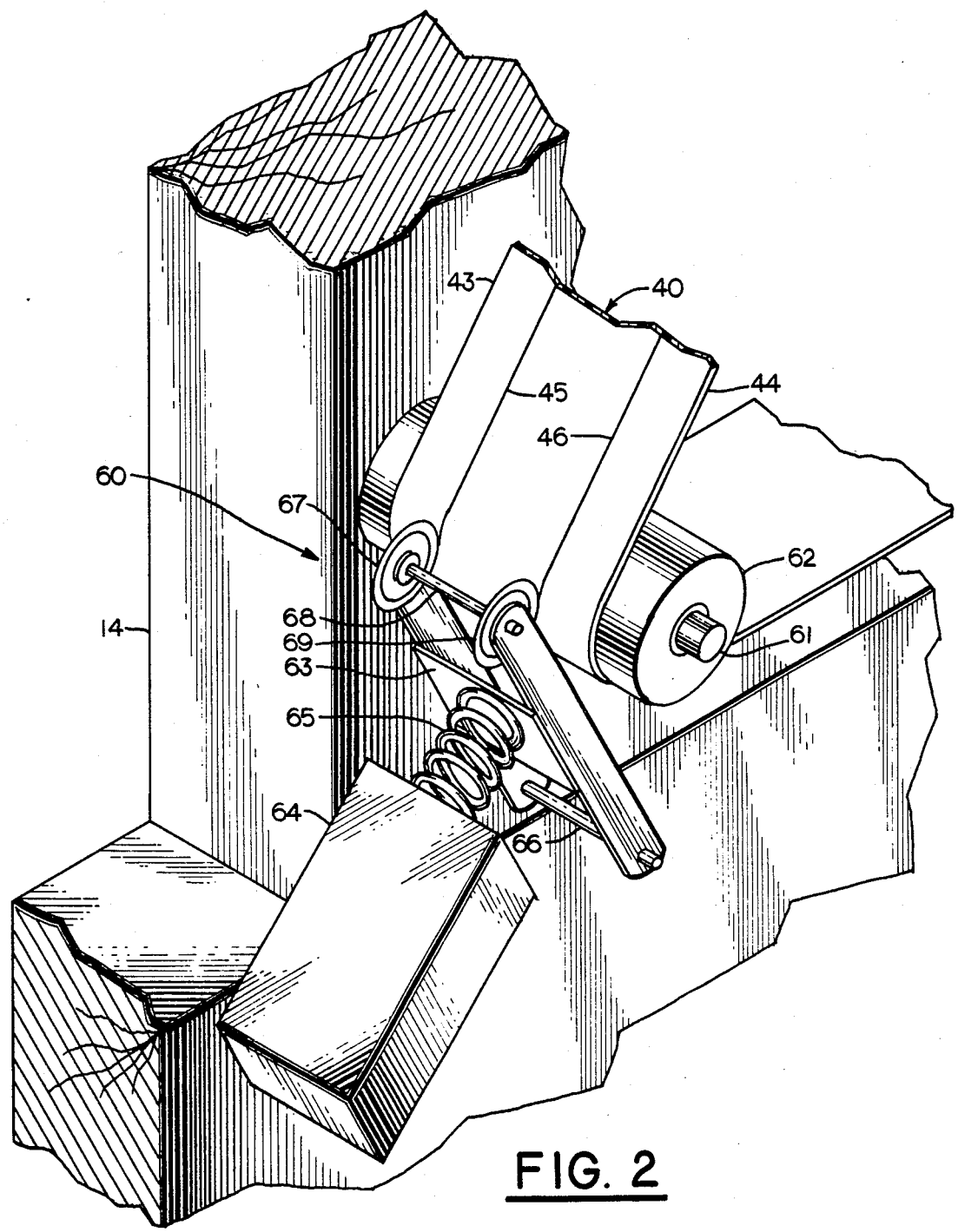
FIG. 2 is a perspective view of the initial creasing apparatus of the present invention.

From the alignment block 54, the polyester film strip is positioned around the peripheral surface of a rubber surfaced backing roller 62 of the creaser assembly 60, as best shown in FIGS. 2 and 3. As the polyester film 40 moves around roller 62, a pair of creaser wheels 67, 69 press a pair of permanent creases 45, 46 in spaced-apart relation to each other in the polyester film 40.

The backing roller 62 is journaled on a shaft 61 that is mounted in the frame 14. The creaser rollers 67, 69 have sharp peripheral surfaces and are mounted in spaced-apart relation to each other on an axle 68 adjacent the peripheral surface of roller 62. The axle 68 is mounted in a pivotal arm assembly 63, which pivots about axis 66 attached to frame 14. A compression spring 65 positioned between the frame assembly 63 and anchor block 64 biases the creaser wheels 67, 69 tightly against the peripheral surface of the backing roller 62. As the film 40 passes between the peripheral surface of roller 62 and the creaser rollers 67, 69, the force exerted by spring 65 causes the creaser rollers 67, 69 to press a pair of permanent creases 45, 46 in the film 40. These creaser rollers 67, 69 are spaced such that the creases 45, 46 are formed slightly less than one-fourth the width of the film 40 inward from the respective edges. Therefore, as the lateral edge portions 43, 44 are folded over the mid-portion 47 toward each other, as will be described below, they approach but do not overlap each other.

From the creaser assembly 60, the film 40 passes around two folding rollers 70, 72 mounted on the frame 14. As best seen in FIGS. 1, 5, and 6, these folding rollers are positioned offset from a straight line between the creaser roller 62 and a folding block 74. In this offset relation, the film 40 must pass through a slight curve of approximately fifteen degrees around the folding rollers 70, 72. The pressure of the rollers 70, 72 in combination with the curve through which the film 40 passes and the creases 45, 46 formed in the film 40, causes lateral edge portions 43, 44 to fold upwardly as shown in FIGS. 5 and 6 around the lateral sides of the rollers 70, 72. The first roller 70 causes the lateral edges 43, 44 to begin folding upwardly out of the straight line relationship mid-section 47. The roller 72 causes a further folding of the outer edge portions 43, 44 to nearly a right angle relation to the mid-portion 47. The curve mentioned above around rollers 70, 72 is necessary to make the distance which the center or mid-portion 47 travels equal to the distance travelled by the lateral edge portions 43, 44, which must fold up and back down again over the mid-portion 47.

As the film proceeds from the last folding roller 72, it enters the folding channel 74 to complete the fold as best shown in FIG. 7. The folding channel 74 is comprised of two block portions 75, 76 positioned adjacent to each other. The block portion 75 has a channel 77 formed therein so that when it is placed adjacent block 76, it forms an enclosed slot of a width approximately equal to the width of the mid-portion 47 of film 40. The height of the slot is less than the width of the lateral edge portions 43, 44. Therefore, this channel or slot 77 causes the lateral end portions 43, 44 to fold over on top of the mid-portion 47 to form the open tube or cell structure of the honeycomb insulation material according to this invention.

Figure 9:
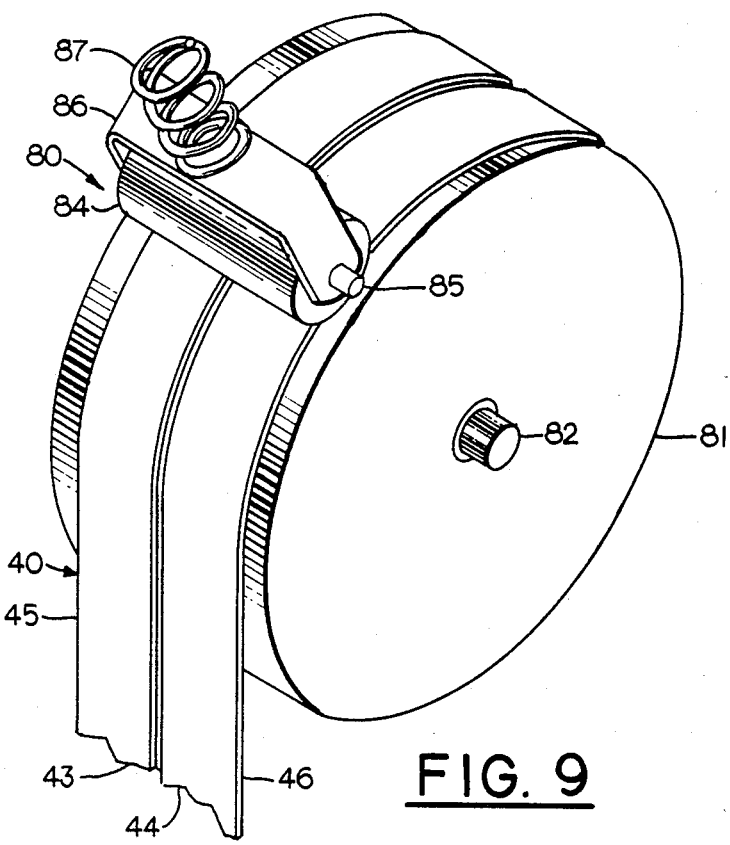
FIG. 9 is a perspective view of the first crimper assembly.

As the film 40 leaves the folding channel 74, it passes through the first crimper assembly 80. The first crimper assembly 80 is comprised of a large roller 81 journaled to rotate on a shaft 82. The film 40 passes around the peripheral surface of the roller 81 as best shown in FIG. 9. A crimp roller 84 is positioned adjacent the peripheral surface of roller 81 and is journaled to roll on an axle 85 mounted in a frame 86. A compression spring 87 biases the roller 84 tightly onto the peripheral surface of roller 81. Therefore, as the film 40 passes between the crimp roller 84 and the peripheral surface of roller 81, it is tightly pressed and squeezed to form a permanent fold in the film 40 along the crease lines 45, 46. Consequently, the open tube form of the polyester film strip 40 as shown in FIG. 9 is more or less permanently set.

Even though the crimper 80 sets the fold in the polyester film along the crease lines, the original bias of the molecular structure of the polyester material to a flat plane tends to cause the creases or bends to round out or sag over a long period of time. Such rounding out or sagging can be detrimental to the appearance of the insulation panel and can interfere with its functional operations. An effective way to permanently set the fold in a sharp crimp or bend is to heat the polyester material. It has been found effective to the point where it substantially looses its elasticity and becomes sufficiently plastic to re-orient the molecular structure along the bends to conform with the sharp crimps, although it is not necessary on some plastic films to heat the material to this temperature of plasticity for achieving sharp, permanent folds. Therefore, the polyester film is passed around the peripheral surface of a large diameter heated roller where it is heated to approximately 250 to 350 degrees F. As the polyester film material is heated against the cylindrical peripheral surface of the roller 90 under the slight tension in the operating system, the molecular structure of the polyester material rearranges to permanently set the crease.

In order to avoid ripples and other undesireable effects that can result from internal stresses due to uneven heating, it is necessary to apply the heat evenly and uniformly across the entire width of the polyester film. Merely heating along the edges or along the creases will usually cause internal stresses that result in warps or wrinkles, which is avoided by the uniform heating of the film across its entire width on a large radius surface under constant tension according to this invention.

While the polyester material is hot, press rollers 95 and 96 apply a rolling pressure across the entire width of the film to set the bend or crimp permanently at a sharp angle. These press rollers 95, 96 are similar to the press roller 84 shown in FIG. 9. Also, the heated roller 90 has a biased mount which applies an upward pressure to press the peripheral surface of the wheel 90 against the peripheral surface of the roller 81 of the crimper assembly and against the peripheral surface of roller 101 of the drive assembly. As the film 40 passes between the respective peripheral surfaces of these rollers, the pressure thereon is also effective to help set the permanent crease.

After the film leaves contact with the peripheral surface of the heated roller 90, it travels around the peripheral surface of drive roller 101. Drive roller 101 is cooled so that it is effective to lower the temperature of the film so that the bends or creases 43, 44 permanently are set. Of course, if the material was heated above its plastic point, this cooling roller 101 must be able to cool the temperature of the material below its plastic point. Otherwise, somewhat less cooling capacity is required where the material was not heated above its plastic point. Additional press rollers 105 and 106 press the film 40 against the peripheral surface of drive roller 101 and help to maintain the sharp bend or crimp in the film as the film cools down.

Figure 10:
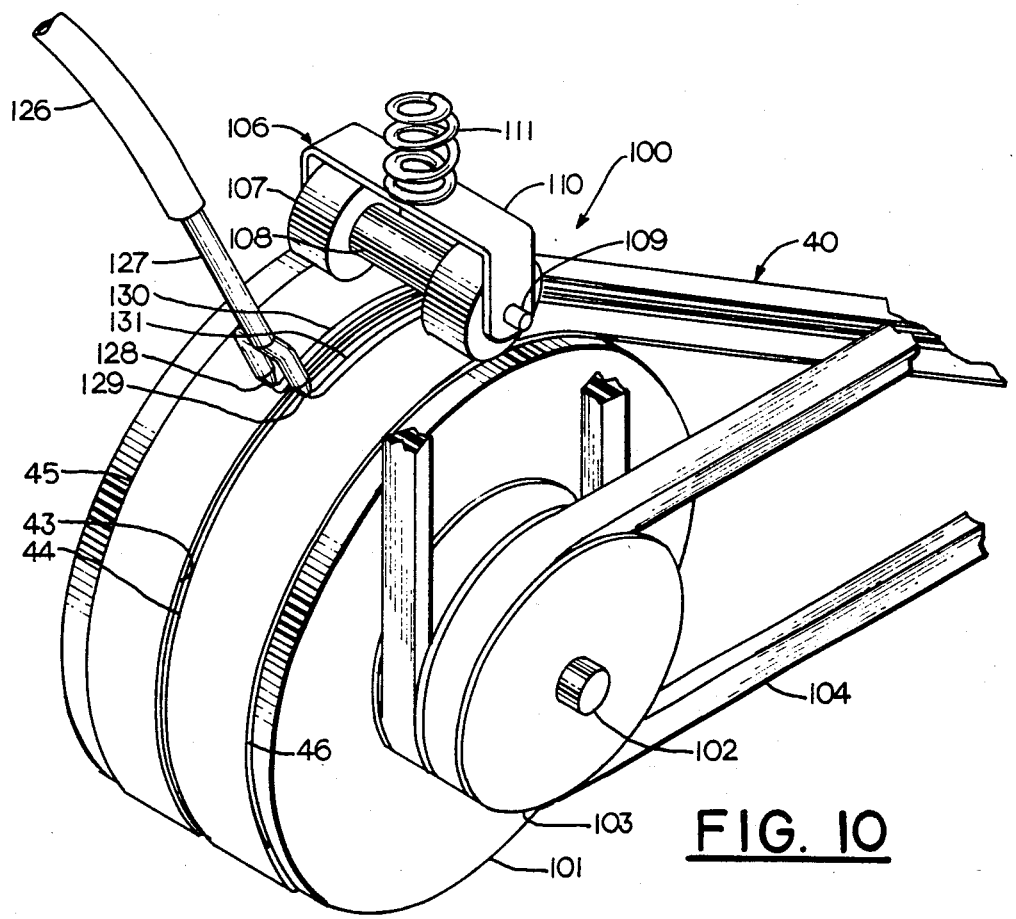
FIG. 10 is a perspective view of the film drive wheel and adhesive applicator assembly.

As mentioned above, the drive roller 101 not only is effective to cool the film 40, but it is also used to pull the film 40 through the bending and heat setting apparatus. As best seen in FIGS. 1 and 10, a motor 112 has mounted thereon a belt pulley 113, and a drive belt 104 passes around the belt pulley 113 and around double pulley 103 which is connected to the drive roller 101. The drive roller 101 is journaled on a shaft 102 so that the motor 112 and drive belt 104 are effective to rotate the drive roller 101. The press rollers 105, 106, in addition to holding the crease as the film 40 cools as described above, also apply pressure to press the film 40 against the cylindrical peripheral surface of the drive roller 101 to provide the traction necessary for pulling the film 40 through the apparatus.

Figure 15:
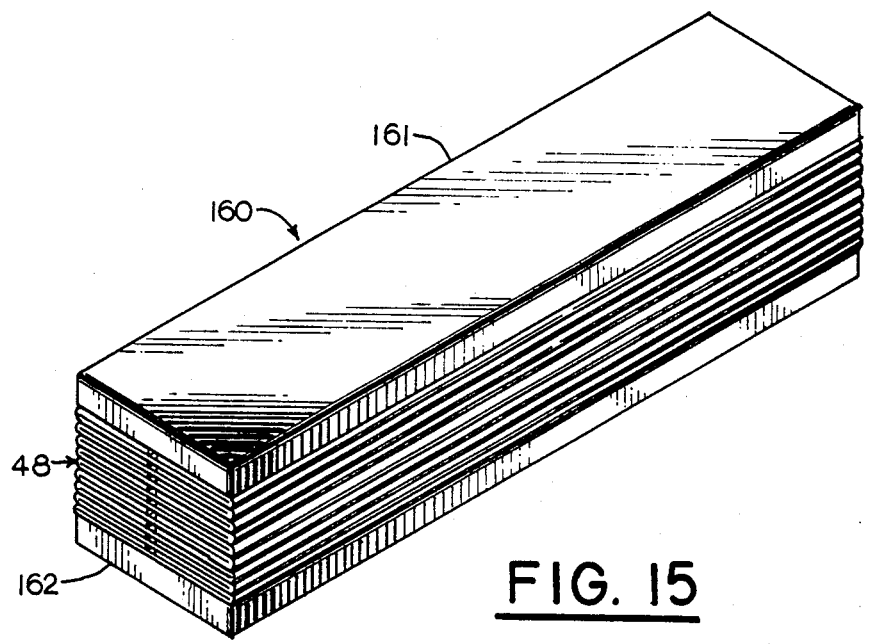
FIG. 15 is a perspective view of the honeycomb insulation material fabricated according to the present invention shown in its collapsed state.

The adhesive applicator assembly 120 is used to apply a liquid adhesive material, such as a glue, to the surface of the film 40 for adhering adjacent lengths of the film 40 together in the honeycomb panel structure shown in FIGS. 14 and 15. The glue applicator assembly 120 includes a positive displacement gear pump 121, which is effective to disperse glue in direct proportion to the rotational speed of the pump. The pump is driven by a belt 123, which passes around the double pulley 103 on the drive roller 101 and around the pump pulley 122 on the main shaft of the pump. Therefore, the pump 121 rotates at a speed directly proportional to the speed of rotation of the drive roller 101, thus proportional to the linear speed of the film 40 passing through the apparatus.

The pump 121 draws the liquid adhesive from a reservoir 124 through a suction tube 125 and discharges it at a rate directly proportional to the rotational speed of the pump through a discharge line 126 to the glue applicator 127, which is positioned directly over the film 40 as it passes around the peripheral surface of the drive wheel 101. As best seen in FIG. 10, the glue applicator 127 has two spaced-apart nozzles 128, 129 positioned on opposite sides of the gap in the film between adjacent edge portions 43, 44. Therefore, as the film 40 passes over the peripheral surface of drive roller 101, the glue applicator 127 discharges two uniform beads of glue 130, 131 on the edge portions 43, 44 adjacent the gap therebetween. If the drive roller is speeded up to increase the speed of the film passing through the apparatus, the pump 21 pumps proportionally more glue so that there are always two uniform beads of glue 130, 131 deposited on the film. The press roller assembly 106 is constructed with a roller 107 having a recessed portion 108 therein to allow the glue beads 130, 131 to pass undisturbed thereunder. The roller 107 is journaled on an axle 109 which is mounted in a frame 110. The spring 111 biases the roller 107 against the film 40 on the peripheral surface of roller 101.

After the film 40 passes over the drive roller 101, it proceeds to the tension and speed control assembly 140. The tension and speed control assembly 140 is comprised of a dancer arm 142 pivotally mounted on a pin 143, a tightener roller 144 on the distal end of the dancer arm 142, a tension spring 145 connected to the dancer arm 142, and a reostat 147. This tension and speed control assembly 120 is necessary to maintain a constant tension on the film 40 between the drive roller 101 and the stacking arm 124, as will be described more fully below.

As the stacking arm 24 rotates in the angular direction indicated by the arrows 31, it takes up and winds around itself the film 40 in successive lengths approximately equal to the length of the stacking bed 25. As shown in FIG. 1, two stacks 48, 49 of the film 40 are deposited in layers on opposite flat surfaces of the stacking bed 25. As also shown in FIG. 11, the stack bed 25 is of a width approximately equal to the width of the film 40, and the front guides 28 guide the film 40 in a uniform manner onto the stacking bed 25 between the front guides 28 and back side plate 26. A rigid support arm 30 is fastened to the back side plate 26 to give the stacking arm structural rigidity to remain flat throughout its entire length.

As an end of the stacking arm 24 approaches the guide roller 156, the velocity of the film 40 drawn through the alignment block 152 and around guide roller 156 decreases significantly. When both ends of the stacking arm 24 are in a straight line relation with the guide roller 156, the velocity of the film 40 traveling around roller 156 momentarily decreases to zero. However, as the rotation of the stacking arm 24 continues and approaches a right angle relationship to a line extending between guide roller 156 and main shaft 32, the velocity of the film 40 drawn through the alignment block 152 and around guide roller 156 increases significantly. Therefore, there are two cycles of alternate increasing and decreasing velocity of the film 40 for every revolution of the stacking arm 24.

The tension and speed assembly 140 is effective to maintain a constant tension on the film 40 being wrapped around the stacking bed 25. It also controls the speed at which the motor 112 draws the film 40 through the folding, heating setting, and glue applicator assemblies. For example, as an end of the stacking arm 24 approaches the guide roller 156 and the velocity of the film 40 decreases, the spring 145 pulls arm 142 and tightener roller 144 in a direction away from the stacking assembly 20 to take up the slack in the film 40 and to maintain a constant tension thereon.

At the same time, in order to keep from having too much film 40 delivered from the heat setting assembly 90, the spring connection 148 between dancer arm 142 and rheostat 147 is effective to adjust the rheostat 147 to slow down the speed of the motor 112. Therefore, the rate at which the film 40 is pulled through the the folding, heat setting, and glue assemblies is also slowed, and the positive displacement gear pump 121 of the glue applicator assembly 120 decreases proportionately the amount of glue applied to the surface of the film 40.

Alternately, as the stacking arm 24 continues to rotate and its ends move away from the guide roller 156, it draws the film 40 at a greater velocity. As the increased rate of draw decreases the slack of the film 40 that was taken up by the tightener roller 144, it draws the tightener roller 144 and dancer arm 142 toward the stacking assembly, still under a constant tension applied by the spring 145. However, in order to make up the lost slack, the rheostat 147 is automatically adjusted again to speed up the motor 112 to feed the film 40 through the folding, heat setting, and glue applicator assemblies at a faster rate. In this manner, there is always a sufficient length of film 140 available at a constant tension to be stacked on the stacking arm 24, regardless of the wide ranging variation in velocity at which the film 40 is drawn by the stacking assembly 20.

Figure 12:
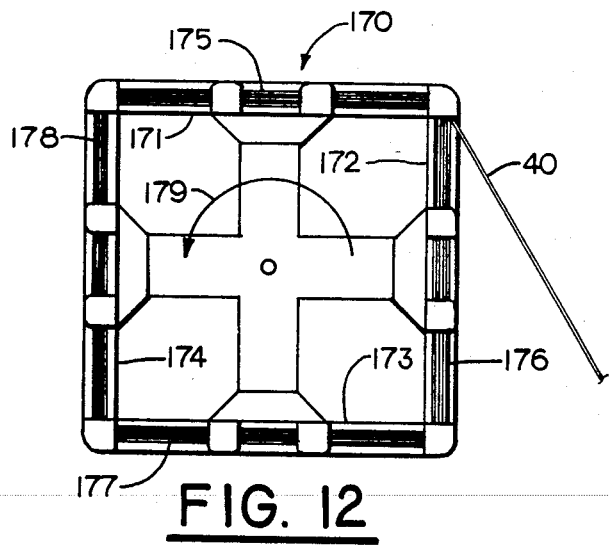
FIG. 12 is an elevation view of an alternative embodiment stacking assembly.
Figure 13:
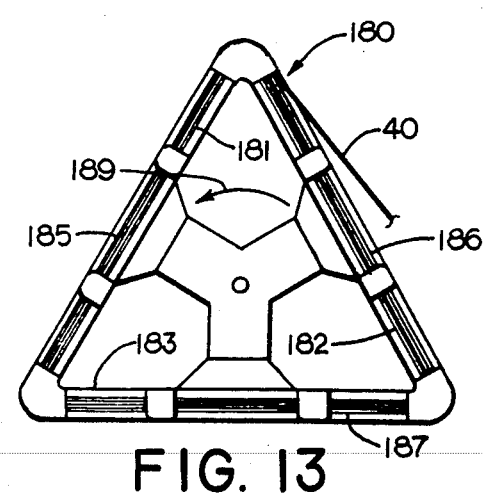
FIG. 13 is an elevation view of another form of stacking assembly according to the present invention.

Although the preferred embodiment shown in FIG. 1 includes an elongated, basically one-dimensional linear stacking arm 24 with two flat surfaces on opposite sides of an elongated stacking bed 25, any configuration of stacking arm will work as long as it has at least one flat side on which to stack a panel of adjacent straight tubular film layers one on another. For example, a square embodiment of a stacking reel 170 is shown in FIG. 12. This square embodiment 170 has four elongated flat stacking beds 171, 172, 173, 174 on which are stacked simultaneously four stacks of tubular film layers 175, 176, 177, 178 as it rotates in the angular direction indicated by arrow 179. Another variation is the triangular embodiment 180, which has three elongated flat stacking beds 181, 182, 183. Therefore, three stacks of tubular film layers 185, 186, 187 can be formed simultaneously as the triangular reel 180 rotates in the angular direction indicated by arrow 189.

In order to complete the construction of the expandable and contractable honeycomb panels as shown in FIGS. 14 and 15, a stack on a flat side of a stacking bed is cut away from the rounded end sections and removed from the stacking bed. The removed section of the stack is therefore comprised of a plurality of straight, unwrinkled tubular film structures laminated and adhered together one on another in a neat, clean cut expandable panel 160, as shown in FIGS. 14 and 15. In order to give the panel structural rigidity, a top slat 161 can be adhered to the top tubular film, and a rigid bottom slat 162 can be adhered to the bottom tubular film. The preferred form is with the top and bottom slats 161, 162 being at least as wide as the honeycomb panel as shown in FIGS. 14 and 15 with the adjacent tubular film structures adhered to the slats across that entire width.

In this completed form, the honeycomb panel or moveable insulation assembly 160 can be expanded to cover a desired section of wall, window, opening or the like as shown in FIG. 14, or it can be retracted as shown in FIG. 15. The final construction of the panel 160 is best seen in FIG. 14 wherein the lateral edges 43, 44 are adhered to the outside surface of the mid-portion 48 of the next adjacent tubular film. The sharply creased folds 45, 46 tend to bias the lateral edge portions 43, 44 toward the mid-portion or bottom portion 47. This bias tends to partially close the honeycomb cells or at least not allow them to be stretched fully open under the normal weight of the panel. Therefore, the panel hangs naturally in approximately the configuration shown in FIG. 14 in which it is effective to cover and insulate a wall, window, or the like while maintaining its neat, clean cut, attractive appearance and functional utility.

It is significant to note that expandable and contractable honeycomb insulation panels constructed according to the method of this invention are neat in appearance, clean cut, and have virtually no visible warps or wrinkles. As shown in FIG. 14, the sharp, permanently set creases 45, 46 retain the film portions 44, 47 and 43, 47 immediately adjacent the creases 45, 46 at acute angles to each other. These portions continue to diverge at increasingly large angles to each other until they approach the middle of the cell where they curve in the opposite direction so that the upper and lower portions of each cell are substantially parallel to each other at the middle between the two opposite creases 45, 46.

These very desireable attributes are a result of the sharp uniform creases and folds applied by this method and where the folds are heat set under a constant tension on a surface uniformly across the entire film width as disclosed herein, which keeps the creases from opening too widely when the panel 160 is expanded to cover a window. In order to eliminate internal stresses in the polyester plastic material, it is important that the entire width of the film be heated uniformly and cooled uniformly during the heat setting process. It is also important that the adhesive material be applied uniformly and in direct proportion to the speed at which the film 40 is fed through the folding and heat setting apparatus in oder to maintain uniform and neat appearing glue lines.

It should be mentioned that this process has also been used successfully by applying double sided contact tape as the adhesive material instead of a liquid adhesive such as the glue described herein to adhere the adjacent tubular film structures together. Further, the method described herein of continuously wrapping the tubular film 40 around a stacking arm or reel having at least one flat stacking surface thereon also is effective to maintain the neat, sharp appearance of the finished panel with no undesireable wrinkles or warps in any of the tubular film sections therein that often result from stacking individual lengths of tubes or from revolving a continuous roll of tubes around rollers. In summary, it has been found that the fabrication of expandable and contractable honeycomb panels for insulation and the like according to this invention produces a much neater and more effective insulation panel product than any of the prior art products or processes.

While the present invention has been described with some degree of particularity, it should be appreciated that the present invention is defined by the following claims construed in light of the prior art so that modifications or changes may be made to the preferred embodiment of the present invention without departing from the inventive concepts contained herein.

I claim:

1. An expandable and contractable honeycomb panel comprised of:

a plurality of elongated open faced tubular plastic film sections laminated together one on top of another, each tubular section having a continuous bottom portion, a front top portion folded partially over the front side of the bottom portion, a rear top portion folded partially over the rear side of the bottom portion, in such a manner that the respective inside edges of the front and rear top portions approach nearly but do not overlap each other, and sharp, permanently set creased folds between the respective top portions and the outside edges of the bottom portion in a manner tending to bias the top portions toward the bottom portion, the outside surface of the top portions adjacent the inside edges thereof being adhered to the outside surface of the bottom portion of the next adjacent tubular film.

2. The expandable and contractable honeycomb panel of claim 1, wherein the top and bottom panels and the creases therebetween are of sufficient strength and resilience to maintain an acute angle between the top and bottom portions at said creases when the panels are expanded.

3. The expandable and contractable honeycomb panel of claim 2, wherein the top and bottom portions have a transition curve located approximately midway between the lamination of said tubular sections and the creased folds wherein said transition changes from a curve in one direction about an axis interior to the tubular section to a curve in the opposite direction about an axis exterior to the tubular section when the panels are expanded.

4. An expandable and contractable honeycomb panel comprised of:

a plurality of elongated tubular sections laminated together one on top of another, each tubular section having a bottom portion, a front top portion folded over the front side of the bottom portion, a rear top portion folded over the rear side of the bottom portion and sharp folds separating the respective top portions and the bottom portion, the outside surface of the top portions at locations spaced from said folds being adhered to the outside surface of the bottom portion of the next adjacent tubular section.

5. The expandable and contractable honeycomb panel of claim 4 wherein the respective top portions are separated from the bottom portion by permanently set creased folds.

6. The expandable and contractable honeycomb panel of claim 5 wherein the respective inside edges of the front and rear top portions face each other but do not overlap and the outside surface of the top portions adjacent the inside edges thereof are adhered to the outside surface of the bottom portion of the next adjacent tubular section.

* * * * *

REEXAMINATION CERTIFICATE (1505th)
United States Patent [19]

Colson

[11] B1 4,603,072
[45] Certificate Issued  Jul. 9, 1991

[54] HONEYCOMB INSULATING MATERIAL

[75] Inventor: Wendell B. Colson, Boulder, Colo.

[73] Assignee: Thermocell, Ltd., Broomfield, Colo.

Reexamination Request:
No. 90/001,938, Feb. 12, 1990

Reexamination Certificate for:
| | |
|---|---|
| Patent No.: | 4,603,072 |
| Issued: | Jul. 29, 1986 |
| Appl. No.: | 612,876 |
| Filed: | May 22, 1984 |

Related U.S. Application Data

[63] Continuation-in-part of Ser. No. 406,319, Aug. 9, 1982, Pat. No. 4,450,027.

[51] Int. Cl.⁵ .................................................. B32B 3/12
[52] U.S. Cl. .................................. 428/116; 428/188
[58] Field of Search ................... 156/197, 291, 292; 160/84.1; 428/73, 116, 117, 118

[56] References Cited

U.S. PATENT DOCUMENTS

| | | | |
|---|---|---|---|
| Re. 30,254 | 4/1980 | Rasmussen | 428/12 X |
| Re. 31,129 | 1/1983 | Rasmussen | 428/116 X |
| 2,020,639 | 11/1935 | Grayson et al. | 428/188 X |
| 3,164,507 | 1/1965 | Masuda | 428/116 X |
| 3,165,820 | 1/1965 | Fromson | 156/197 X |
| 3,281,516 | 10/1966 | Southwick | 264/285 |
| 3,416,051 | 12/1968 | Pinto et al. | 318/6 |
| 3,428,515 | 2/1969 | Lorentzen | 428/117 |
| 3,762,980 | 10/1973 | Maggio | 156/204 X |
| 3,963,549 | 6/1976 | Rasmussen | 156/193 |
| 4,019,554 | 4/1977 | Rasmussen | 428/116 X |
| 4,242,161 | 12/1980 | Hulten et al. | 428/116 X |
| 4,288,485 | 9/1981 | Suominen | 428/116 |
| 4,346,132 | 8/1982 | Cheng et al. | 428/188 X |
| 4,450,027 | 5/1984 | Colson | 428/116 X |
| 4,603,072 | 7/1986 | Colson | 428/116 |

FOREIGN PATENT DOCUMENTS

| | | | |
|---|---|---|---|
| 129793 | 11/1948 | Australia | 428/116 |
| 1683194 | 1/1971 | Fed. Rep. of Germany . | |
| 1568745 | 5/1969 | France . | |
| 6706563 | 11/1968 | Netherlands | 428/116 |
| 988064 | 4/1965 | United Kingdom | 428/116 |
| 1308296 | 2/1973 | United Kingdom | 428/116 |

*Primary Examiner*—Henry F. Epstein

[57] ABSTRACT

The method and apparatus for fabricating honeycomb expandable insulation panels disclosed herein includes a method and apparatus for folding a continuous thin film of flexible plastic material into a uniform, open faced tubular configuration and for heat setting the folds in permanent sharp creases. It also includes a rotatable rack apparatus for continuously stacking successive lengths of the tubular formed plastic film one on top of another on flat surfaces and adhering them together in the form of a neat, uniform expandable panel of interior honeycomb cell configuration.

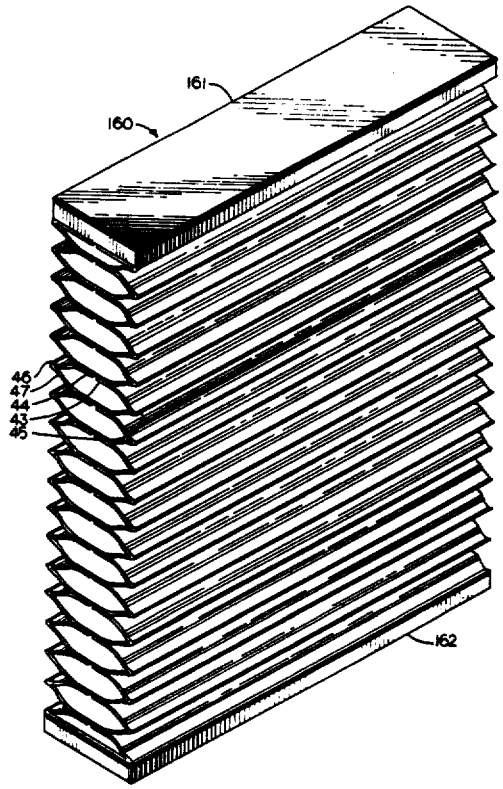

U.S. Patent

July 9, 1991

B1 4,603,072

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 4, 5 and 6 are cancelled.

Claims 1, 2 and 3 are determined to be patentable as amended.

New claims 7, 8, 9, 10 and 11 are added and determined to be patentable.

1. An expandable and contractable honeycomb panel comprised of:
a plurality of elongated open faced tubular plastic film sections laminated together one on top of another, each tubular section having a continuous bottom portion, a front top portion folded partially over the front side of the bottom portion, a rear top portion folded partially over the rear side of the bottom portion, in such a manner that the respective inside edges of the front and rear top portions approach nearly but do not overlap each other, and sharp, permanently set creased folds between the respective [top portions] *bottom portion* and the [outside] *inside* edges of the [bottom portion] *top portions separating the respective top portions and the bottom portion* in a manner [tending to bias] *biasing* the top portions toward the bottom portion, the outside surface of the top portions adjacent the inside edges thereof being adhered to the outside surface of the bottom portion of the next adjacent tubular film.

2. The expandable and contractable honeycomb panel of claim 1, wherein the top and bottom [panels] *portions* and the creases therebetween are of sufficient strength and resilience to maintain an acute angle between the top and bottom portions at said creases when the [panels are] *panel is* expanded.

3. The expandable and contractable honeycomb panel of claim 2, wherein the top and bottom portions have a transition curve located approximately midway between the [lamination] *location of adherence* of said tubular sections and the creased folds wherein said transition changes, *as measured from said location of adherence toward said creases,* from a curve in one direction about an axis interior to the tubular section to a curve in the opposite direction about an axis exterior to the tubular section when the [panels are] *panel is* expanded.

*7. An expandable and contractable honeycomb panel comprised of:
a plurality of elongated tubular sections laminated together one on top of another, each tubular section having a bottom portion, a front top portion folded over the front side of the bottom portion, a rear top portion folded over the rear side of the bottom portion and sharp permanently set creased folds separating the respective top portions and the bottom portion along each side of the tubular section with the distance between the folds defining a cell width, the outside surface of the top portions at locations spaced from said folds being adhered to the outside surface of the bottom portion of the next adjacent tubular section, and the top portions of each cell from said locations to about the middle of the cell width being substantially parallel to the underlying bottom portion thereof in an expanded state of the panel.*

*8. An expandable and contractable honeycomb panel comprised of:
a plurality of elongated tubular sections laminated together one on top of another, each tubular section having a bottom portion, a front top portion folded over the front side of the bottom portion, a rear top portion folded over the rear side of the bottom portion and sharp permanently set creased folds separating the respective top portions and the bottom portion, the outside surface of the top portions at locations spaced from said folds being adhered to the outside surface of the bottom portion of the next adjacent tubular section, and the molecular structure of each tubular section at the folds being oriented to conform with the folds.*

*9. An expandable and contractable honeycomb panel comprised of:
a plurality of elongated tubular sections laminated together one on top of another, each tubular section having a bottom portion, a front top portion folded over the front side of the bottom portion, a rear top portion folded over the rear side of the bottom portion and sharp permanently set creased folds separating the respective top portions and the bottom portion, the outside surface of the top portions at locations spaced from said folds being adhered to the outside surface of the bottom portion of the next adjacent tubular section, and each tubular section and the sharp folds having substantially no internal stresses tending to remove the sharp folds in an expanded state of the panel.*

*10. An expandable and contractable honeycomb panel comprised of:
a plurality of elongated tubular sections laminated together one on top of another, each tubular section having a bottom portion, a front top portion folded over the front side of the bottom portion, a rear top portion folded over the rear side of the bottom portion and sharp permanently set creased folds separating the respective top portions and the bottom portion, the outside surface of the top portions at locations spaced from said folds being adhered to the outside surface of the bottom portion of the next adjacent tubular section, and the panel is constructed of polyester material and the molecular structure thereof is arranged to a bias of the tubular section with said sharp folds.*

*11. The expandable and contractable honeycomb panel of any one of claims 1, 3 or 7 wherein the panel is constructed of polyester material and the molecular structure thereof is arranged to a bias of the tubular section with said sharp folds.*

* * * * *